(12) United States Patent
Garrett et al.

(10) Patent No.: US 11,855,969 B2
(45) Date of Patent: *Dec. 26, 2023

(54) METHOD AND SYSTEM FOR TRUSTED NOTIFICATIONS

(71) Applicant: MASTERCARD INTERNATIONAL INCORPORATED, Purchase, NY (US)

(72) Inventors: Duncan Garrett, London (GB); John Beric, London (GB); Michael Ward, Taunton (GB); David Anthony Roberts, Warrington (GB)

(73) Assignee: MASTERCARD INTERNATIONAL INCORPORATED, Purchase, NY (US)

( * ) Notice: Subject to any disclaimer, the term of this patent is extended or adjusted under 35 U.S.C. 154(b) by 141 days.

This patent is subject to a terminal disclaimer.

(21) Appl. No.: 17/494,077

(22) Filed: Oct. 5, 2021

(65) Prior Publication Data

US 2022/0029970 A1    Jan. 27, 2022

Related U.S. Application Data

(63) Continuation of application No. 16/228,238, filed on Dec. 20, 2018, now Pat. No. 11,146,539.

(30) Foreign Application Priority Data

Dec. 22, 2017 (EP) .................................. 17210186

(51) Int. Cl.
*H04L 9/40* (2022.01)
*G06Q 20/32* (2012.01)
(Continued)

(52) U.S. Cl.
CPC ..... *H04L 63/0428* (2013.01); *G06Q 20/3255* (2013.01); *G06Q 20/3274* (2013.01);
(Continued)

(58) Field of Classification Search
None
See application file for complete search history.

(56) References Cited

U.S. PATENT DOCUMENTS 6,385,655 B1  5/2002  Smith et al.
6,725,381 B1  4/2004  Smith et al.
(Continued)

FOREIGN PATENT DOCUMENTS

GB    2 544 341 A    5/2017

OTHER PUBLICATIONS

"Search Report Issued in European Application No. EP 17 21 0186.7", dated Jun. 7, 2018, 7 Pages.
(Continued)

*Primary Examiner* — Gregory S Cunningham, II
(74) *Attorney, Agent, or Firm* — Talem IP Law, LLP

(57) ABSTRACT

A method for trusted notifications comprises: receiving, at a first host having at least one trusted server, a request message from a sender computing device, the request message comprising a request identifier and instructions to: update, at a second host, a recipient account associated with a recipient computing device, and to make a corresponding update at the first host to a sender account associated with the sender computing device. The method further comprises authorizing, at the first host, the request message; updating the sender account; generating a secure message at the at least one trusted server, the secure message comprising the request identifier and an indication from the at least one trusted server that the update completed; and sending the secure message from the first host to the sender computing device. The secure message can be received at the sender computer device and conveyed to the recipient computing device.

18 Claims, 6 Drawing Sheets

(51) Int. Cl.
*G06Q 20/42* (2012.01)
*G06Q 20/40* (2012.01)

(52) U.S. Cl.
CPC ..... *G06Q 20/3276* (2013.01); *G06Q 20/3278* (2013.01); *G06Q 20/40* (2013.01); *G06Q 20/42* (2013.01)

(56) References Cited

U.S. PATENT DOCUMENTS

| | | |
|---|---|---|
| 2004/0148252 A1 | 7/2004 | Fleishman |
| 2010/0211507 A1 | 8/2010 | Aabye et al. |
| 2011/0208961 A1 | 8/2011 | Bushman et al. |
| 2013/0060690 A1* | 3/2013 | Oskolkov ............ G06Q 20/386 705/42 |
| 2014/0164254 A1 | 6/2014 | Dimmick |
| 2014/0230010 A1 | 8/2014 | Ginter et al. |
| 2015/0324777 A1 | 11/2015 | Moshal |
| 2018/0005230 A1 | 1/2018 | Zovi et al. |
| 2018/0039985 A1 | 2/2018 | Siegler et al. |
| 2018/0247296 A1 | 8/2018 | Win et al. |
| 2018/0315027 A1* | 11/2018 | Kumar ............... G06Q 20/3278 |
| 2019/0122191 A1* | 4/2019 | Filipiak ................ G06Q 20/383 |
| 2019/0303931 A1* | 10/2019 | Valencia ................... H04L 9/50 |

OTHER PUBLICATIONS

"International Search Report and Written Opinion Issued in International Application No. PCT/US2018/059986", dated Mar. 14, 2019, 9 Pages.

Non-Final Office Action issued in U.S. Appl. No. 16/228,238, dated Apr. 29, 2020, 35 pages.

Non-Final Office Action issued in U.S. Appl. No. 16/228,238, dated Aug. 11, 2020, 40 pages.

Francis Knott "What is Private Key Encryption?" Mar. 6, 2014, 2 pages, Retrieved from: https://web.archive.org/web/20140306101755/http://www.koolspan.com/blog/private-key-encryption/.

Final Office Action issued in U.S. Appl. No. 16/228,238, dated Apr. 9, 2021, 29 pages.

* cited by examiner

METHOD AND SYSTEM FOR TRUSTED NOTIFICATIONS

CROSS REFERENCE TO RELATED APPLICATIONS

This application is a continuation of U.S. Ser. No. 16/228,238, filed Dec. 20, 2018, which claims priority under 35 U.S.C. 119(a) to EP Application No. 17210186.7, filed Dec. 22, 2017.

TECHNICAL FIELD

The present invention relates to a method and system for providing trusted notifications in a communications system.

BACKGROUND

In a networked computer system it is necessary to send notifications to one or more users in the network, for example to request that a user take a specific action, or to confirm completion of an action. For example, a user of a mobile device connected to a communications network may receive a push notification from a server of the network requesting to update their password or other account details, and on taking such action, receive a further push notification indicating success. Such notifications may be sent by email or SMS, for example. A problem with such notification processes is that it may be possible for a bad actor to spoof the notification email or SMS so that it appears to come from a trusted party rather than the attacker, and/or to alter the notification content.

One context in which network notifications is important is in relation to electronic payments, in which it can be problematic for a recipient of an electronic payment to obtain sufficiently prompt confirmation that the payment has been made. In one example, a beneficiary might ask a payer to make an electronic bank transfer to the beneficiary's bank account. Typically the beneficiary relies on the integrity of the payer to ensure that the payment has taken place. Sometimes the host of the beneficiary's account might send a confirmation message to the beneficiary, for example using SMS. However, there is often a delay of a few minutes or hours before this confirmation message is received. This delay can provide a fraudulent payer with an opportunity to make a false claim that a payment has been made. The falseness of this claim might only be revealed when the absence of a confirmation message is noticed, some time later. This might provide an opportunity for the fraudulent payer to obtain goods or services without payment. In addition, SMS messages can be generated falsely as there is no intrinsic authenticity protection in this protocol. Thus, a beneficiary may be duped into believing that a payment has been made when it has not.

BRIEF SUMMARY

According to embodiments of the invention there is provided a method for trusted notifications, comprising the steps of: receiving, at a first host having at least one trusted server, from a sender computing device, a request message, the request message comprising a request identifier and instructions to: update, at a second host, an account which is associated with a recipient computing device, and to make a corresponding update at the first host to an account associated with the sender computing device; authorizing, at the first host, the request message; updating the account associated with the sender computing device; generating a secure message at the at least one trusted server, the secure message comprising the request identifier and an indication from the at least one trusted server that the update has been completed, and sending the secure message from the first host to the sender computing device; receiving the secure message at the sender computing device; conveying the secure message from the sender computing device to the recipient computing device; and validating the secure message at the recipient computing device to confirm completion of the update.

In this way, a secure message can be delivered to the recipient device from the first host, via the sender device. The secure message can provide confirmation that the update has taken place. In this way, the recipient can receive rapid confirmation of the update. The confirmation is also reliable because it has been generated by a trusted server of the host of the sender account and in some embodiments, can by appropriate coding be recognised as such (e.g. when the update request is a payment request, a PAN field with a non-zero BIN followed by zeros), rather than the sender themselves.

This technique involves generation of the secure message at the sender account (first) host. Advantageously this shifts processing burden away from the sender device and the recipient device.

The secure message may be conveyed to the recipient device from the sender device using a wide variety of technologies, as required by the circumstances. In one example, the secure message may be delivered by displaying a barcode on a display screen of the sender device, which can be read by a reader of the recipient device. In another example, the secure message may be transmitted using SMS, e-mail, Bluetooth or near field communication.

The method may include sending a request for payment from the sender device to the first host. Details of the payment can be entered at the sender device and transmitted to the first host, for example with appropriate security indicating intent and consent of the payer. For example, the request for payment may include details of the recipient account, a payment amount and a reference. Thus, the payment may be a push-payment such as an instruction for a bank transfer.

The method may also involve acquiring payment details, to be included in the update request, at the sender device from the recipient device. Thus, the sender device can interface with the recipient device to obtain payment details. This can allow the sender device to discover the recipient account number as well as the payment reference and the payment amount.

The payment details can be acquired at the sender device using a wide variety of different methods and technologies, depending on the demands of the circumstances. In one example, the sender device may comprise a barcode reader that could read a barcode displayed on a screen of the recipient device. The displayed barcode may be decoded to reveal the recipient account number and other payment details. In another example, the sender device may communicate with the beneficiary device by Bluetooth®, Wifi or using near field communication to acquire the payment details. Preferably the recipient device can be implemented using a standard smartphone without the addition of any bespoke hardware.

In some embodiments the secure message is digitally signed and the step of opening the secure message at the recipient device involves validating the secure message. The message may be signed at the first host. The recipient device may store a public key for validating the message. This may protect the message from tampering during transmission. In particular, the contents of the secure message may be invisible to the sender device. The sender device may process the secure message as a package without necessarily having viewing access to the contents—in the instance of some digital signature cryptographic constructs this viewing is perfectly possible.

According to certain embodiments there is provided a computer readable medium comprising executable instructions which, when executed by a computer, cause the computer to perform steps comprising: receiving, from a sender computing device, a request message, the request message comprising a request identifier and instructions to: update, at a remote host, an account which is associated with a recipient computing device, and to make a corresponding update to an account associated with the sender computing device; authorizing the request message; updating the account associated with the sender computing device; and generating a secure message comprising the request identifier and an indication from at least one trusted server that the update has been completed, and instructing a communications interface to send the secure message to the sender computing device.

According to certain embodiments there is provided a system for trusted notifications, comprising: at least one processor; a storage medium which stores data relating to a plurality of user accounts; and a communications interface configured to receive, from a sender computing device, a request message, the request message comprising a request identifier and instructions to: update, at a remote host, an account which is associated with a recipient computing device, and to make a corresponding update to an account, of said plurality of accounts, associated with the sender computing device; wherein the at least one processor is configured to: authorize the request message; update the account associated with the sender computing device; and generate a secure message comprising the request identifier and an indication from at least one trusted server that the update has been completed, and instruct the communications interface to send the secure message to the sender computing device.

The request message may be a request for payment from the sender device to the recipient computing device.

In certain embodiments the at least one processor is configured to digitally sign the secure message.

According to embodiments of the invention there is provided a payment system, comprising: a sender device; a recipient device; and a first host; wherein the first host is configured to make a payment from a sender account to a recipient account, to generate a secure message including details of the payment, and to send the secure message to the sender device; wherein the sender device is configured to receive the secure message from the first host, and to convey the secure message to the recipient device; and wherein the recipient device is configured to open the secure message to confirm the payment.

According to yet further embodiments of the invention there is provided a computer readable medium comprising executable instructions which, when executed by a computer, cause the computer to perform steps comprising: making a payment from a sender account to a recipient account; generating a secure message at the sender account host, including details of the payment, and sending the secure message from the sender account host to a sender device; receiving the secure message at the sender device; conveying the secure message from the sender device to a recipient device; and opening the secure message at the recipient device to confirm the payment.

According to yet further embodiments of the invention there is provided a sender device, comprising: a recipient device interface configured to acquire payment details from a recipient device; and a network interface configured to send a request for payment to a first host, and to receive a secure message from the first host, including details of the payment; wherein the recipient device interface is configured to send the secure message to the recipient device, which can be opened to confirm the payment.

In practice, a plurality of recipient device interfaces may be provided so that the sender device and the recipient device can communicate through a number of channels. Thus, the sender device may acquire payment details through one channel, and may send the secure message through another channel, using different technologies.

In other embodiments, a sender computing device comprises: at least one processor; and a storage medium having computer-readable instructions stored thereon which, when executed by the at least one processor, cause the at least one processor to: transmit a request message to a first host having at least one trusted server, the request message comprising a request identifier and instructions to: update, at a remote host, an account which is associated with a recipient computing device, and to make a corresponding update at the first host to an account associated with the sender computing device; receive, from the first host, a secure message comprising the request identifier and an indication from the at least one trusted server that the update has been completed; and provide the secure message to the recipient computing device.

The request message may be a request for payment from the sender device to the recipient computing device. The sender computing device may further comprise a code reader for acquiring payment details from the recipient device to be included in the request for payment.

In further embodiments, a recipient computing device comprises: at least one processor; and a storage medium having computer-readable instructions stored thereon which, when executed by the at least one processor, cause the at least one processor to: provide encoded data to a sender device to cause the sender device to transmit a request message to a first host having at least one trusted server, the request message comprising a request identifier and instructions to: update, at a remote host, an account which is associated with the recipient computing device, and to make a corresponding update at the first host to an account associated with the sender computing device; receive, from the sender device, a secure message comprising the request identifier and an indication from the at least one trusted server that the update has been completed; and validate the secure message.

The secure message may be digitally signed by the at least one trusted server, and the at least one processor may be configured to validate the secure message using a certified public key of the at least one trusted server.

BRIEF DESCRIPTION OF THE DRAWINGS

Certain embodiments of the invention are now described, by way of example, with reference to the drawings, in which.

DETAILED DESCRIPTION

Embodiments of the invention will be described mostly in relation to its application to an electronic payment process, but it will be appreciated by the skilled person that the principles outlined herein are applicable to trusted notifications in other contexts.

Figure 1:
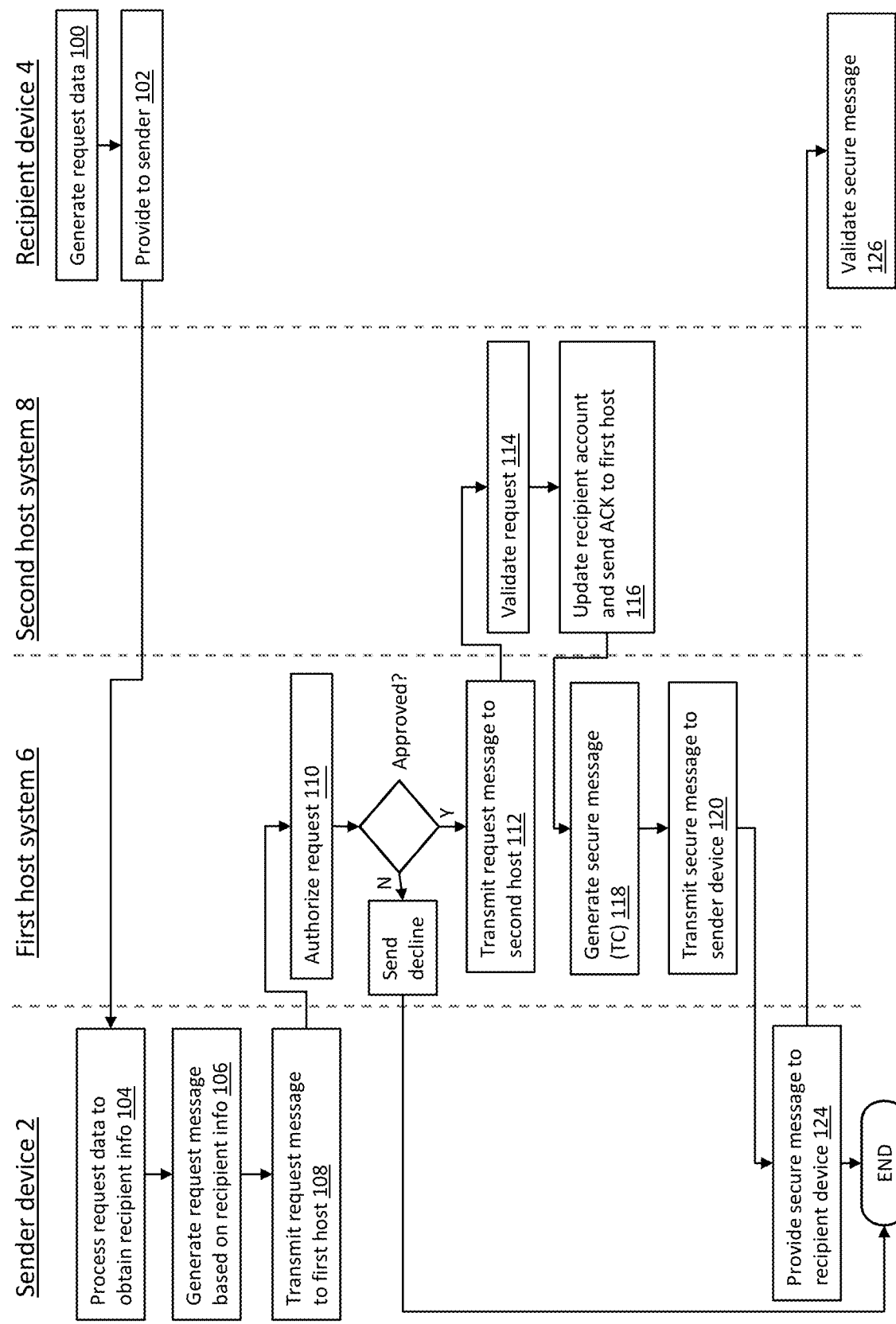
FIG. 1 is a flow diagram of an example trusted notification method.
Figure 4:
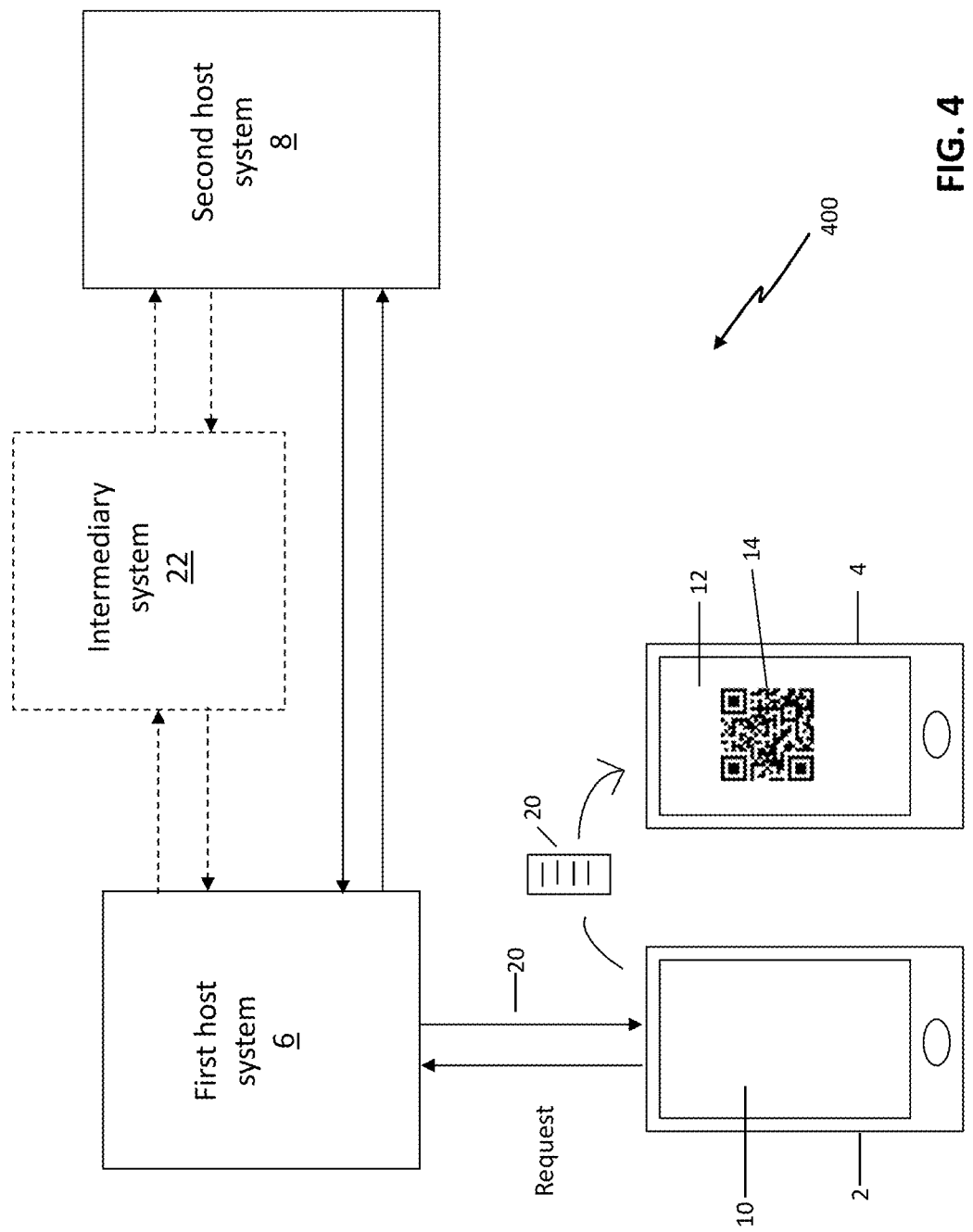
FIG. 4 depicts a high-level architecture of a networked computer system in which the trusted notification method may be employed.

Referring initially to FIG. 1, an exemplary trusted notification method is carried out by a sender device 2 in communication with a first host system 6, which is in turn in communication with a second host system 8 (optionally via an intermediary system 22 as shown in FIG. 4). The first host system 6 maintains accounts for users, including the user of sender device 2. For example, the first host system 6 may be, or may include, a host processor and/or a core banking system of a financial institution. The second host system 8 similarly maintains accounts for users, including the user of recipient device 4, and again in an electronic payments context may be, or may include, a host processor and/or a core banking system of a financial institution. In general, the first and second host systems 6, 8 will be operated by different entities, but in some embodiments (as will later be described), they may be operated by the same entity.

Turning to FIG. 4, a networked computer system 400, which in this embodiment is a payment system, includes a sender device 2 and a recipient device 4 which may be embodied as smartphones in an embodiment of the invention. The sender device 2 and recipient device 4 have respective display screens 10, 12, which can be used as graphical user interfaces. The payment system 400 also includes the sender's bank (first host system) 6 and the recipient's bank (second host system) 8. These are shown as separate entities, but in practice they may be one and the same.

Figure 5:
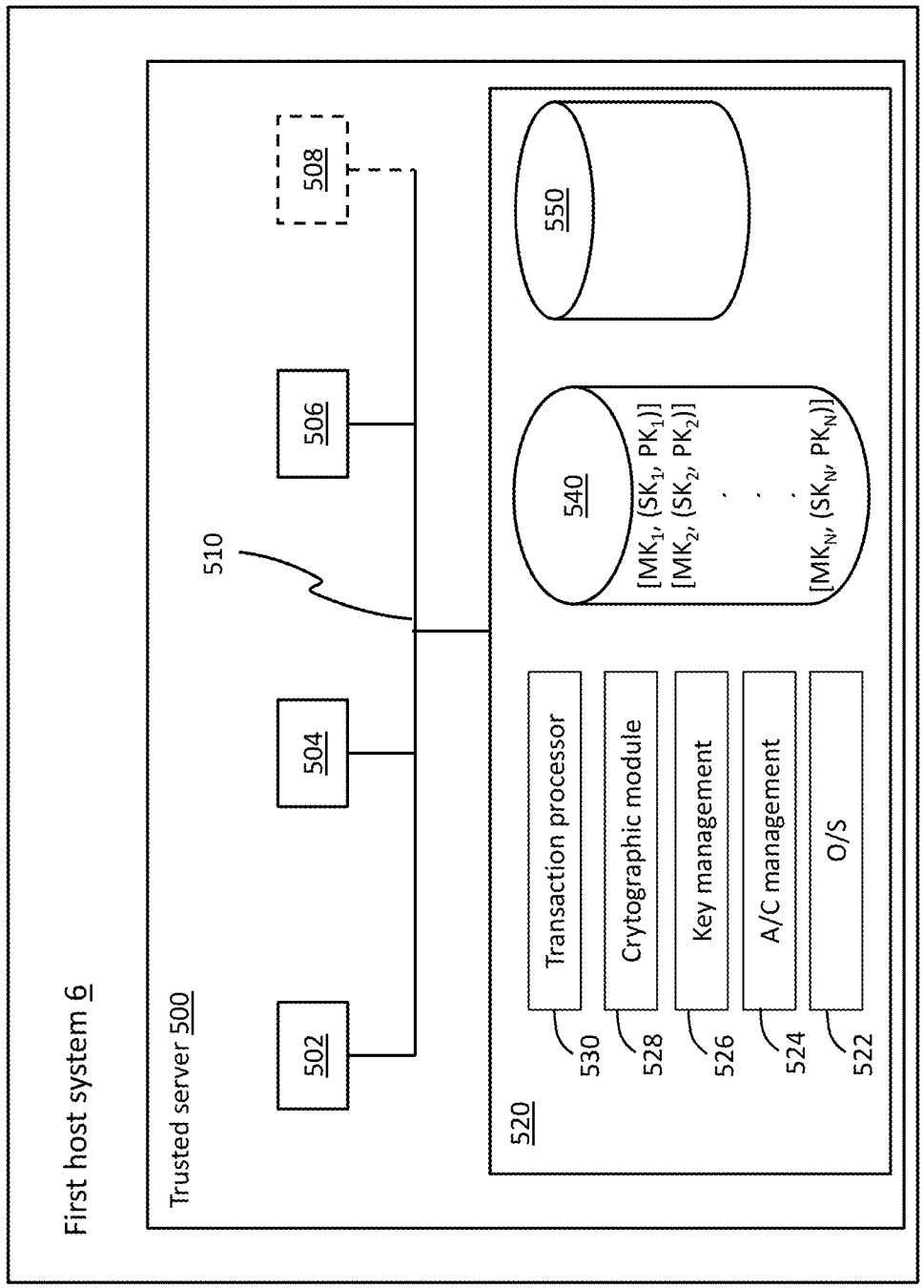
FIG. 5 shows a host system of the system of FIG. 4.

The architecture of the first host system 6 is shown in more detail in FIG. 5. First host system 6 comprises at least one trusted server 500 having at least one processor 502, volatile storage (RAM) 504, at least one network interface 506, and non-volatile storage (e.g., one or more magnetic disks and/or one or more solid-state drives) 520, all interconnected by a bus 510. A single trusted server 500 is shown in FIG. 5, though in practice a host system 6 will include multiple such servers. Optionally, the first host system 6 may comprise or be in communication with a hardware security module (HSM) 508, for use in management of cryptographic keys as will later be described.

The non-volatile storage 520 has stored thereon a plurality of modules, including operating system 522, account management module 524, key management module 526, cryptographic module 528 and transaction processor module 530. Although these are depicted as software components in FIG. 5, it will be appreciated that the term "module", as used throughout this specification, may encompass hardware, software, or a combination of hardware and software. Similarly, as used herein, the term "component" refers to software, hardware, or a combination of the two. For example, any of the modules shown in FIG. 5, or any other module or component referred to herein, may be implemented in whole or in part as one or more application-specific integrated circuits (ASICs), field-programmable gate array (FPGAs), or other integrated circuit device in which the logic embodied in the module or component is implemented. In addition, the boundaries between modules or components as depicted are exemplary only, and it would be possible to implement alternative modules which perform the functions of any two or more of the modules shown in FIG. 5, for example.

Also stored on non-volatile storage 520 is a key store 540 and a user account database 550. The key store contains copies of each user's asymmetric signature key or preferably comprises a key pair (SK, PK) for the first host system 6, where SK is the private key of first host system 6 and PK is the public key of first host system 6. The public key PK is certified by a certificate authority, such as Mastercard. The private key SK may be used to sign messages at the first host system 6, while the corresponding public key PK and its associated certificate may be transmitted to external devices, such as sender device 2 and/or recipient device 4, such that the public key PK can first be validated using the certificate authority's public key (e.g. the Mastercard public key), and then used to validate the signed messages.

Advantageously, the first host may also maintain a copy of Issuer symmetric master keys used to generate Application Cryptograms for inclusion within the signed message, thereby making the transaction data compatible with the EMV specification, such that an "off-the-shelf" EMV kernel (see below) can be used for validation of messages and processing of transaction data.

The user database 550 stores account data, which may include, for each user, at least one account number, a corresponding balance or line of credit for each account number, at least one device identifier for devices associated with the user (for example, sender device 2), and personal particulars of the user such as address, date of birth and so on.

Figure 6:
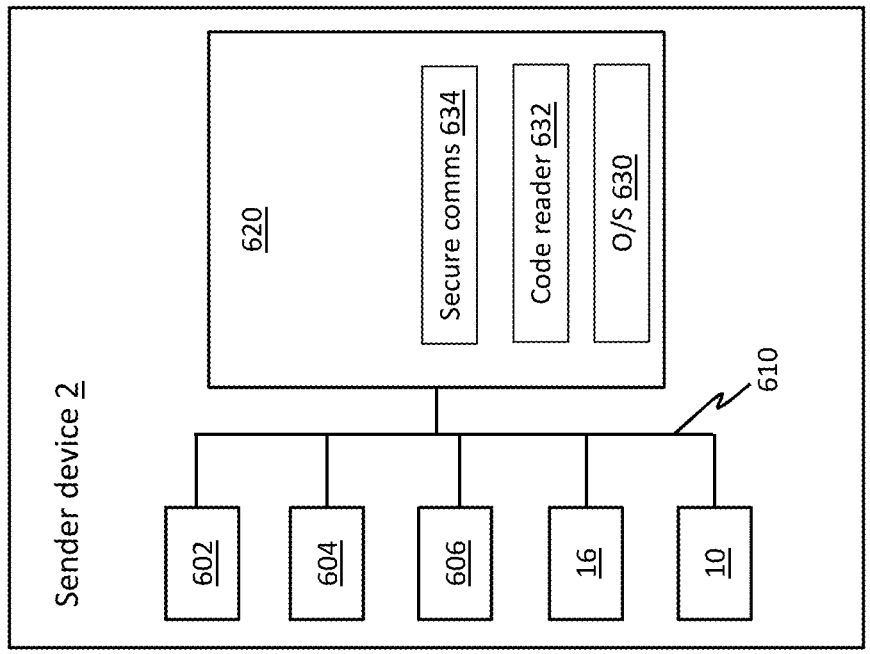
FIG. 6 shows a sender device of the system of FIG. 4.

Turning now to FIG. 6, there is shown a sender device 2, including at least one processor 602, volatile storage (RAM) 604, at least one network interface 606, a camera 16, a display 10 (which may also function as a user input interface), and non-volatile storage 620, all interconnected by a bus 610. Stored on non-volatile storage 620 are a number of software modules, including operating system 630 (e.g., iOS™ or Android™), code reader module 632, and secure communications module 634, each of which is configured to cause the at least one processor 602 to perform one or more functions. As mentioned above in relation to FIG. 5, each module may also be implemented in part or in whole as hardware.

The code reader module 632 is configured to receive and interpret encoded data, such as a QR code or other optical code captured by the camera 16, or encoded data captured by a network interface 606 (e.g., a near field communication (NFC) or Bluetooth interface) in order to extract information which is needed to initiate an account update request, such as a payment request, at the host system 6. Typically, such encoded data may be generated by the recipient device 4 in a manner which will be explained in detail below.

The secure communication module 634 is configured to open a secure communication channel with the host system 6 in order to securely receive data from, and transmit data to, the host system 6 via one of the at least one network interfaces 606. For example, the secure communication module 634 may be, or form part of, or comprise, a mobile banking application which is configured to communicate securely with host system 6.

Figure 7:
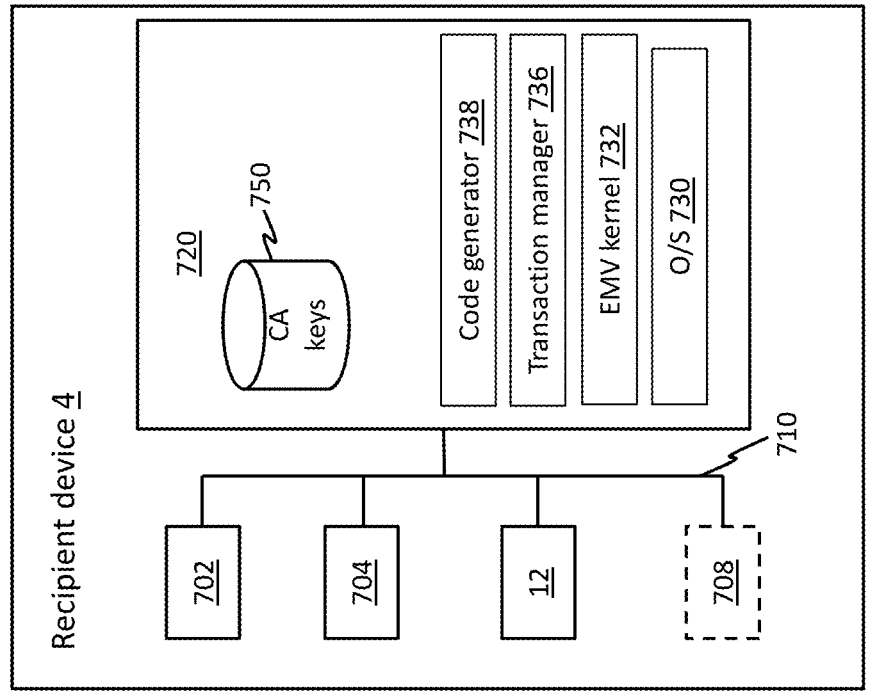
FIG. 7 shows a recipient device of the system of FIG. 4.

Turning to FIG. 7, an exemplary recipient device 4 comprises at least one processor 702, volatile storage (RAM) 704, a display 12, and non-volatile storage 720, all interconnected by a bus 710. Optionally, the recipient device 4 further comprises at least one communications interface 708, such as a Bluetooth interface, NFC controller, or GSM or EDGE interface, for example.

Stored on non-volatile storage 720 of the recipient device 4 are a number of software modules, including an operating system (such as Apple iOS™ or Android™) 730, EMV level 2 kernel 732 (or at least a subset thereof having functionality appropriate for validating CDA digital signatures), transaction manager 736 and code generator 738. The software modules may, of course, alternatively be implemented as hardware modules (in which case they would be separate from the non-volatile storage 720), or as a combination of hardware and software.

EMV level 2 kernel 732 includes a library of functions which provide processing logic and data that is required to process a smart card application in order to perform an EMV transaction. In the present embodiments, functions of the EMV level 2 kernel 732 may be invoked by the transaction manager 736 in order to decrypt and/or validate encrypted and/or digitally signed messages received from the sender device 2 and/or the second host system 8.

The code generator module 738 receives input data relating to a recipient ID (e.g., an identifier of the recipient device 4, such as a device ID or email address), an amount for the transaction, and a transaction identifier, and generates a code which is readable by the sender device 2 in order to initiate a transaction. For example, the code generator 738 may generate a QR code (or other matrix barcode) containing the recipient ID, the amount, and the transaction ID, and cause the QR code to be displayed on display 12 such that the camera 16 of sender device 2 can read and decode the QR code to obtain data elements needed to generate a transaction request. Alternatively, these data elements may be encoded as part of the payload of an NDEF message, which can then be read by an NFC controller of sender device 2. Other data elements relating to characteristics of the recipient device 4 or the transaction may also be encoded by code generator 738.

Also stored on non-volatile storage 720 is a data store 750 of certificate authority (CA) public keys which are used to verify that signed certificates transmitted by the first host system 6 have in fact been signed by the appropriate certificate authority, and can therefore be trusted. In alternative embodiments, assuming that the recipient device 4 has network connectivity, recipient device 4 may retrieve the appropriate CA public key as and when required.

Returning to FIG. 1, an exemplary transaction process begins at step 100 by the recipient device 4 generating request data, for example information relating to a payment, to be requested from the sender. The request data represents an instruction to update an account at a remote server, in this case the second host system 6 which hosts the account of the recipient device 4. This may be achieved through transaction manager 736 prompting the recipient to enter the required details using the graphical user interface 12 on the recipient device 4. In this example the recipient can enter details of the payment amount, a payment reference, and the recipient account details. In some embodiments, details of the recipient account may be pre-loaded so that these details do not need to be entered manually (since this can lead to errors). For example, the recipient account details may be entered once on recipient device 4 and then stored for use in future transactions.

The recipient account details may be a bank account number, or a primary account number (PAN) of a payment card such as a credit card or debit card. Alternatively, the recipient account details may constitute some other unique user-specified identification, such as a username, email address, or phone number in conjunction with an alphanumeric code, which can be used by the second host system 8 to uniquely identify the user account to which funds are to be credited.

In some embodiments, the payment reference is a random or pseudo-random number which is generated by the recipient device 4 on a per-transaction basis, and stored by transaction manager 736 on the non-volatile storage 720.

At step 102 the recipient device 4 conveys payment information to the sender device 2. This can be achieved in one example by displaying a QR code or other barcode 14 (FIG. 4) on the graphical user interface 12 of the recipient device 4. Encoded within the barcode 14 is information including the payment amount, the payment reference, and the recipient account details, together with any other data elements relating to the recipient device 4 and/or the transaction (as mentioned above), which may be used for validation purposes. Information in the barcode 14 is conveyed to the sender device 2 using the code reader module 632 (which may receive data from a camera 16, or one of the network interfaces 606) on the sender device 2. The camera 16 can scan the barcode 14 and this can be decoded by code reader module 632 at step 104 to reveal the payment information. A person skilled in the art will appreciate that the payment information may be conveyed from the recipient device 4 to the sender device 2 using a wide variety of possible techniques, including Bluetooth, Wifi, e-mail, SMS messaging and near field communication.

Steps 100 and 102 may be omitted in certain embodiments and the sender may directly enter information relating to a payment at the sender's device 2. This may be achieved through an app, for example mobile banking application 634, which can be accessed using the graphical user interface 10. Thus, the sender may be able to enter directly the information regarding the payment amount, a payment reference, and the recipient account details.

At step 106 the sender device 2 generates a request message, including the payment information and an identifier for the sender (such as an account number, tokenized account number, email address or other unique user identifier), and transmits it at step 108, using mobile banking application 634, to the first host system 6, which is the host of the sender's account. For example, once the payment information has been received by the mobile banking application 634 from the recipient device 4 or has been entered by the sender, the sender may cause the request message to be generated by nominating an account (bank account or payment instrument such as a credit card or debit card) to be used for a payment. The request message can be an instruction for the first host system 6 to make the payment to the recipient's account, hosted by the second host system 8. The request message may include the payment information, any other data elements received by the sender device 2 from the recipient device 4 as part of the code 14, and one or more data elements relating to characteristics of the sender device 2 and/or the sender, such as a device identifier, an identifier of a consumer device cardholder verification method (CDCVM), and so on.

At step 110 the first host system 6 authorizes the request contained in the request message. For example, if the request is a payment request, the transaction processor 530 of first host system 6 queries user accounts database 550 to check that the sender has sufficient funds to make the payment. The transaction processor 530 may also perform other validation steps, such as applying any account control rules defined by the sender (e.g. checking whether the sender has exceeded a monthly spending limit). If authorization is unsuccessful, the request is declined and the process ends. Otherwise, at step 112, the request message is forwarded to the second host system 8 so that the second host system 8 can validate it (step 114) and cause the recipient's account to be credited (step 116). If an address of the second host system 8 is not identifiable from the request message itself, then forwarding of the request message may include the transaction processor 530 initially determining, based on the recipient account details, which of a plurality of possible second host systems is responsible for hosting the recipient's account. In alternative embodiments (not shown), the request message may instead be forwarded to intermediary system 22, which stores details of which recipient accounts (e.g., recipient account ranges) map to which of the plurality of second host systems, and can accordingly forward the request message to the appropriate second host system.

Validation step 114 may include the second host system 8 checking that the recipient account details are in an expected format. The expected format may either be a number of a user account to which funds may be credited, or other identifier by which such an account number may be uniquely determined, as discussed above. If the account number is determined to be invalid, then an error is returned (not shown) to the first host system 6. Otherwise, the recipient's account is updated by incrementing it by the amount of the payment, and acknowledgement is sent to the first host system 6 (optionally via the intermediary system 22, if present), at step 116. The first host system 6 may then make a corresponding update to the sender's account by decrementing it by the amount of the payment.

At step 118 the at least one trusted server 500 of first host system 6 generates a secure message 20 (FIG. 4) to confirm that the payment has been made. The secure message 20 includes the payment amount, the payment reference and the receiver's account number. The secure message 20 can be generated using a private key held by the trusted server 500. In one embodiment the secure message 20 is a CDA-signed EMV transaction certificate (TC), which may be generated in similar fashion to TCs which are generated in the course of conventional digital or card-based EMV payment transactions (see sections 6.6 and 8.1 of EMV 4.3 Book 2, available at www.emvco.com). This may be advantageous because it can be incorporated into existing infrastructure for electronic payments.

Figure 2:
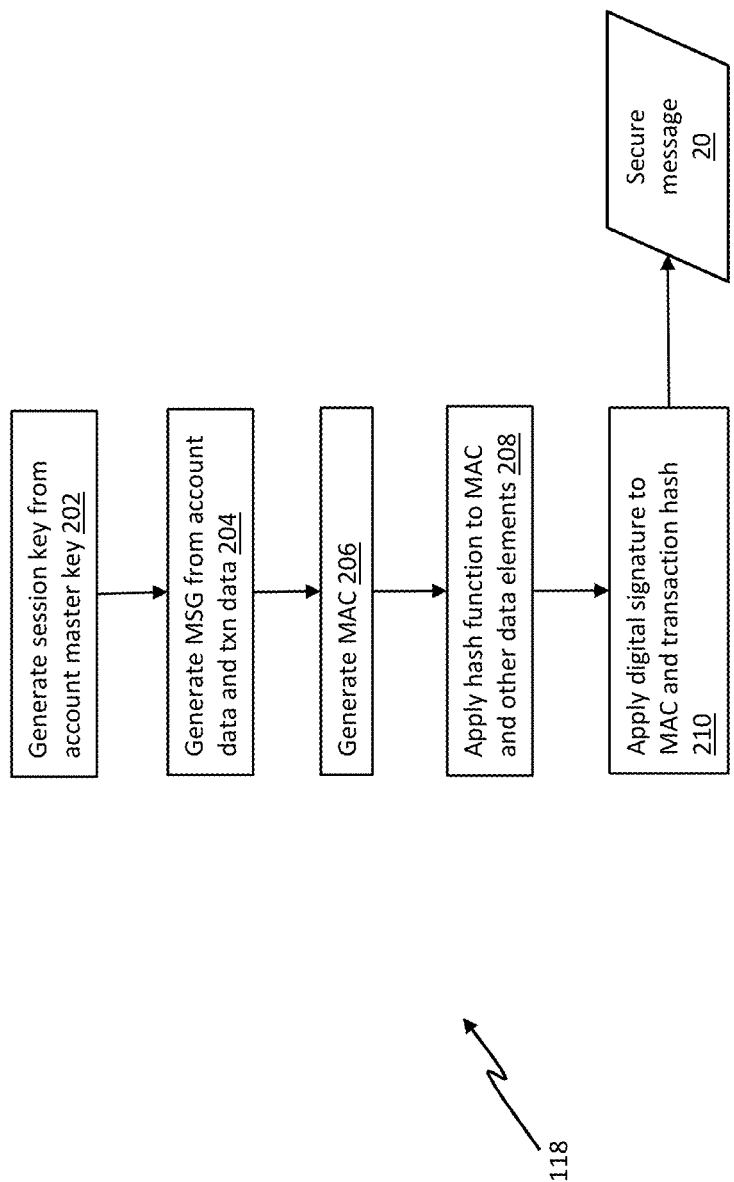
FIG. 2 is a flow diagram showing a message signing process of the method of FIG. 1.

An exemplary process 118 for generating a secure message, carried out by the first host system 6, is shown in FIG. 2. In the illustrated example the secure message is a signed EMV Application Cryptogram, although it is of course possible for other types of secure message to be generated.

In some embodiments, the first host system 6 may bind the transaction to the sender's account, although this is not essential. In such embodiments, at optional step 202, the cryptographic module 528 retrieves an account master key MK from data store 540, based on the user identifier, and generates a session key (for example, using the procedure outlined at Annex A1.3 of EMV 4.3 Book 2).

At step 204 an input message is formed from transaction-level data, such as the above-mentioned payment information, and optionally other information such as transaction date and transaction currency. In embodiments where the secure message is a signed EMV cryptogram, the payment reference may act as an "unpredictable number" for the purposes of cryptogram generation.

At step 206, the cryptographic module 528 generates a message authentication code (MAC) from the input message using the first host system's private key SK. The MAC may be generated using an 8-byte or 16-byte block cipher algorithm such as Triple DES in CBC mode or AES in CBC mode respectively (see Annex A1.2 of EMV 4.3 Book 2), in which case the MAC is an EMV transaction certificate (TC).

At step 208, the cryptographic module 528 generates a transaction data hash code using a hash algorithm such as SHA-1, the hash algorithm taking as input the payment reference (unpredictable number), and optionally one or more data elements derived from the request message (such as the payment information and/or the recipient device information and/or the sender device information).

Finally, at step 210, the cryptographic module 528 signs data including the MAC and transaction data hash code to generate a digital signature (secure message 20) over the data. The digital signature may be generated using a procedure similar to that outlined in Annex A2.1 of EMV 4.3 Book 2, using the private key $SK_j$ of user j, or the first host system's 6 private key SK, together with a signing function.

Referring again to FIG. 1, at step 120 the secure message 20 is sent from the first host system 6 and received at the sender device 2. At step 124 the secure message 20 is provided by the sender device 2 to the recipient device 4, together with the appropriate certified public key (e.g., the public key PK of the first host system 6, or certified public key $PK_j$ corresponding to an account-level private key $SK_j$) held at the issuer. Again, the skilled person will appreciate that this can be performed using a wide variety of techniques including Bluetooth, Wifi, e-mail, SMS messaging and near field communication. The secure message 20 could also be conveyed by displaying a barcode (not shown) on the graphical user interface 10 of the sender device 2, to be read by a reader (not shown) on the recipient device 4.

At step 126 the recipient device 4 validates the secure message 20 to confirm details of the payment. The secure message 20 can be validated using a public key (such as the first host system's 6 certified public key, or the certified public key $PK_j$ corresponding to account-level private key $SK_j$) which has been provided to the recipient device 4 at step 124. The received public key is signed using the public key of a certificate authority, such that the appropriate certificate authority public key stored in CA key data store 750 may be used by recipient device 4 to validate the received public key.

Once opened the secure message 20 can be read so that the recipient device 4 can confirm the payment details. This can allow the recipient device 4 to obtain rapid confirmation of a payment. The confirmation is generated by the payer's bank (first host system) 6, which is a trusted party, and therefore the recipient can rely on the integrity of the bank to achieve a high level of certainty the confirmation is genuine.

Figure 3:
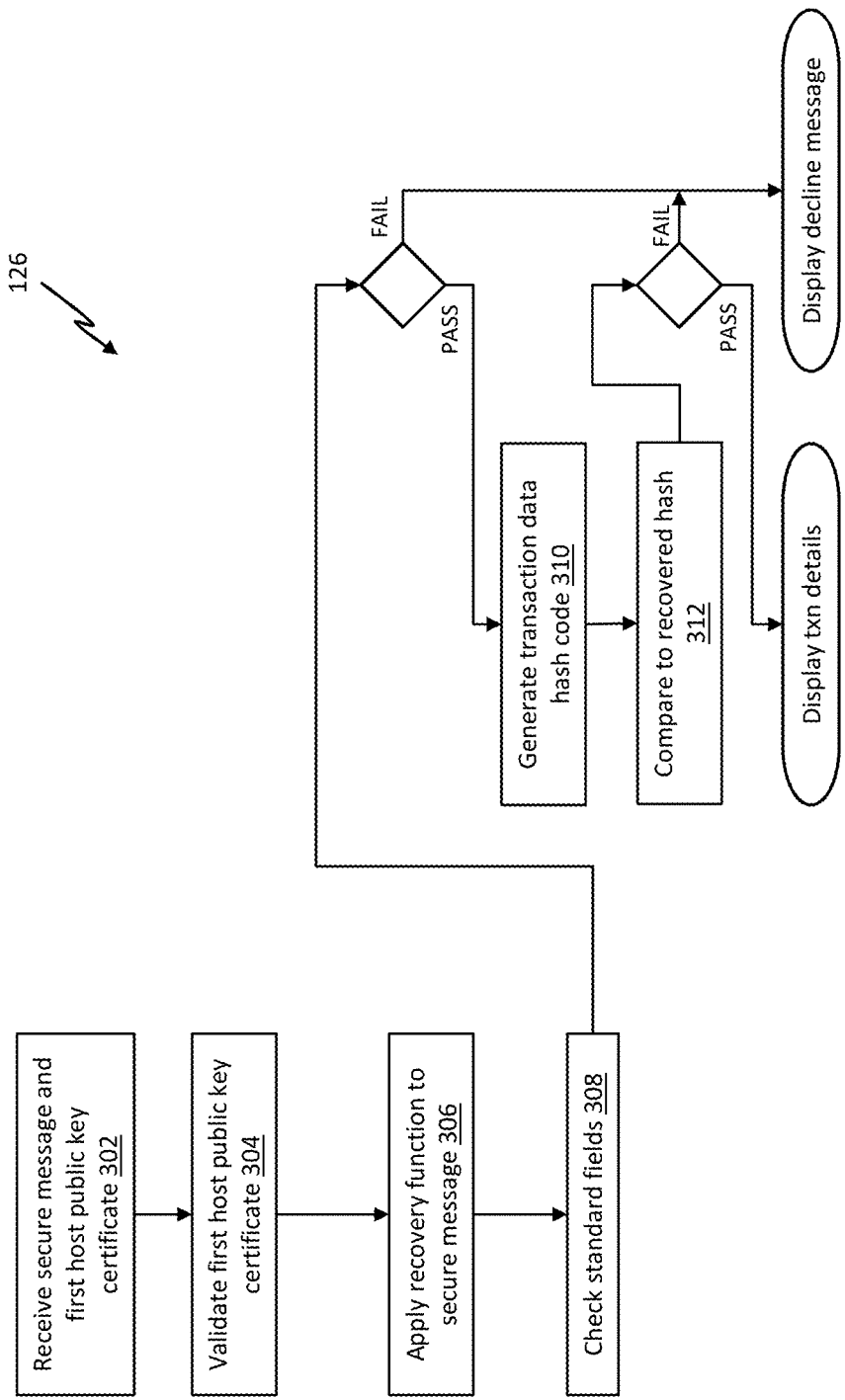
FIG. 3 is a flow diagram of a message validation process of the method of FIG. 1.

An exemplary process for validating the secure message 20 is shown in FIG. 3. At step 302, the secure message and first host system public key certificate are received by the recipient system 4. At step 304 the first host system public key certificate is validated using the certificate authority public key stored in CA key data store 750. Next, at step 306, a recovery function (which is complementary to the signing function used at step 210) is applied to the secure message, using the first host system's 6 public key, or the public key $PK_j$ corresponding to account-level private key $SK_j$, in order to recover the MAC and transaction data hash code from the secure message, as well as standard fields such as a header, a trailer, a signed data format, and so on (see section 6.6.2 of EMV 4.3 Book 2). The recovered standard fields can be checked (step 308) to confirm that they match the expected values. If so, a transaction data hash code can be generated at step 310 using the same inputs as used at step 208, namely payment reference (unpredictable number), and optionally one or more additional data elements, such as the payment information and/or the recipient device information and/or the sender device information. The generated code is then compared to the recovered code at step 312 in order to complete validation of the secure message.

The skilled person will appreciate that a number of modifications to the above embodiments are possible. For example, while specific encryption and signing algorithms are mentioned, it would easily be possible to substitute alternative algorithms in the above-described framework, either currently existing or yet to be devised. Similarly, although specific embodiments reference the EMV specification, it will be understood that other specifications for payment systems may readily be adapted to employ the methods set out herein.

What is claimed is:

1. A method comprising:
   receiving, at a remote sender host having at least one trusted server, from a remote sender computing device, a request message comprising a request identifier and instructions to: update a recipient account associated with a remote recipient computing device and to correspondingly update a sender account associated with the remote sender computing device;
   authorizing the request message;
   updating, at the remote sender host, the sender account associated with the remote sender computing device;
   forwarding the request message to a remote recipient host with the instructions to update the recipient account associated with the remote recipient computing device;
   generating, at the at least one trusted server of the remote sender host, a secure message comprising the request identifier and an indication the recipient account has been updated in accordance with the instructions; and
   sending the secure message to the remote sender computing device.

2. The method of claim 1, wherein the request message is a request for payment from the remote sender computing device to the remote recipient computing device.

3. The method of claim 2, further comprising querying an account database to determine the sender account associated with the remote sender computing device has sufficient funds to make the payment.

4. The method of claim 1, further comprising generating a message authentication code using a private key of the remote sender host that is associated with the remote sender computing device.

5. The method of claim 4, further comprising generating a transaction data hash code using a hash algorithm.

6. The method of claim 5, further comprising:
   generating a digital signature using the message authentication code and the transaction data hash code; and
   digitally signing the secure message using the digital signature.

7. The method of claim 1, further comprising receiving, from the recipient remote host, acknowledgment that the recipient account has been updated in accordance with the instructions.

8. A computing system, comprising:
   at least one processor;
   a storage medium; and
   instructions stored on the storage system that executed by the at least one processor, cause the at least one processor to:
      receive, at a remote sender host having at least one trusted server, from a remote sender computing device, a request message comprising a request identifier and instructions to: update a recipient account associated with a remote recipient computing device and to correspondingly update a sender account associated with the remote sender computing device;
      authorize the request message;
      update, at the remote sender host, the sender account associated with the remote sender computing device;
      forward the request message to a remote recipient host with the instructions to update the recipient account associated with the remote recipient computing device;
      generate, at the at least one trusted server of the remote sender host, a secure message comprising the request identifier and an indication the recipient account has been updated in accordance with the instructions of the request message; and
      send the secure message to the remote sender computing device.

9. The computing system of claim 8, wherein the request message is a request for payment from the remote sender computing device to the remote recipient computing device.

10. The computing system of claim 9, the instructions further causing the at least one processor to query an account database to determine the sender account associated with the remote sender computing device has sufficient funds to make the payment.

11. The computing system of claim 8, the instructions further causing the at least one processor to generate a message authentication code using a private key of the remote sender host that is associated with the remote sender computing device.

12. The computing system of claim 11, the instructions further causing the at least one processor to generate a transaction data hash code using a hash algorithm.

13. The computing system of claim 12, the instructions further causing the at least one processor to:
   generate a digital signature using the message authentication code and the transaction data hash code; and
   digitally sign the secure message using the digital signature.

14. The computing system of claim 8, the instructions further causing the at least one processor to receive, from the recipient remote host, acknowledgment that the recipient account has been updated in accordance with the instructions of the request message.

15. One or more non-transitory storage media having instructions stored thereon that when executed by a processing system, direct the processing system to at least:
   receive, at a remote sender host having at least one trusted server, from a remote sender computing device, a request message comprising a request identifier and instructions to: update a recipient account associated with a remote recipient computing device, and to correspondingly update a sender account associated with the remote sender computing device;
   authorize the request message;
   update, at the remote sender host, the sender account associated with the remote sender computing device;

forward the request message to a remote recipient host with the instructions to update the recipient account associated with the remote recipient computing device;

generate, at the at least one trusted server of the remote sender host, a secure message comprising the request identifier and an indication the recipient account has been updated in accordance with the instructions of the request message; and send the secure message to the remote sender computing device.

16. The non-transitory media of claim 15, wherein the request message is a request for payment from the remote sender computing device to the remote recipient computing device.

17. The non-transitory media of claim 16, the instructions further directing the processing system to query an account database to determine the sender account associated with the remote sender computing device has sufficient funds to make the payment.

18. The non-transitory media of claim 17, the instructions further directing the processing system to:

generate a digital signature using a message authentication code and a transaction data hash code; and digitally sign the secure message using the digital signature.

* * * * *